(12) United States Patent
Huberman et al.

(10) Patent No.: US 7,634,430 B2
(45) Date of Patent: Dec. 15, 2009

(54) SYSTEM AND METHOD FOR ALLOCATING RESOURCES IN A DISTRIBUTED COMPUTATIONAL SYSTEM USING PROPORTIONAL SHARE AUCTIONS

(75) Inventors: Bernardo Huberman, Palo Alto, CA (US); Kevin Lai, East Palo Alto, CA (US); Leslie Fine, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 740 days.

(21) Appl. No.: 11/005,345

(22) Filed: Dec. 6, 2004

(65) Prior Publication Data

US 2006/0122927 A1    Jun. 8, 2006

(51) Int. Cl.
*G06Q 30/00* (2006.01)

(52) U.S. Cl. .................. 705/26; 705/7; 705/37

(58) Field of Classification Search .......... 705/1, 705/26, 27, 400, 37, 7; 709/226; 710/20
See application file for complete search history.

(56) References Cited

U.S. PATENT DOCUMENTS

| | | | |
|---|---|---|---|
| 4,591,980 A | 5/1986 | Huberman et al. | |
| 4,835,680 A | 5/1989 | Hogg et al. | |
| 4,835,732 A | 5/1989 | Huberman et al. | |
| 5,826,244 A | 10/1998 | Huberman | |
| 6,027,112 A | 2/2000 | Guenther et al. | |
| 6,078,906 A | 6/2000 | Huberman | |
| 6,085,216 A | 7/2000 | Huberman et al. | |
| 6,115,718 A | 9/2000 | Huberman et al. | |
| 6,119,052 A | 9/2000 | Guenther et al. | |
| 6,272,507 B1 | 8/2001 | Pirolli et al. | |
| 6,400,372 B1 | 6/2002 | Gossweiler et al. | |
| 6,415,368 B1 | 7/2002 | Glance et al. | |
| 6,441,817 B1 | 8/2002 | Gossweiler et al. | |
| 6,470,269 B1 | 10/2002 | Adar et al. | |
| 6,631,451 B2 | 10/2003 | Glance et al. | |
| 7,152,124 B1 * | 12/2006 | Puri et al. | 710/20 |
| 7,185,046 B2 * | 2/2007 | Ferstl et al. | 709/201 |
| 7,290,260 B2 * | 10/2007 | Miller | 718/104 |
| 2002/0073009 A1 | 6/2002 | Hogg et al. | |

(Continued)

OTHER PUBLICATIONS

"Market-Based Resource Allocation for Utility Data Centers"; Andrew Byde, Mathias Salle, Claudio Bartolini. HP Labs. Sep. 3, 2003; extracted on Internet from Google web site on Mar. 12, 2008.*

(Continued)

*Primary Examiner*—Yogesh C Garg

(57) ABSTRACT

Embodiments of the present invention relate to a system and method for allocating resources in a distributed computational system. Embodiments of the present invention may comprise a plurality of user agent programs, each adapted to place a bid on behalf of a user for computational resources based on a preference for a desired set of the computational resources. Additionally, embodiments of the present invention may comprise an auctioneer program adapted to receive the bid from each of the plurality of user agent programs and to determine entitlement to the computational resources based on an evaluation of the bids. Further, embodiments of the present invention may comprise a bank program adapted to manage records relating to currency corresponding to each of the user agent programs and to facilitate transfer of currency based on an outcome of the evaluation of the bids.

18 Claims, 4 Drawing Sheets

U.S. PATENT DOCUMENTS

| | | | |
|---|---|---|---|
| 2002/0087881 A1* | 7/2002 | Harif | 713/201 |
| 2002/0147895 A1 | 10/2002 | Glance et al. | |
| 2003/0041007 A1* | 2/2003 | Grey et al. | 705/37 |
| 2003/0074166 A1 | 4/2003 | Jackson et al. | |
| 2003/0101124 A1* | 5/2003 | Semret et al. | 705/37 |
| 2003/0233391 A1* | 12/2003 | Crawford et al. | 709/104 |
| 2004/0117224 A1* | 6/2004 | Agarwal et al. | 705/7 |
| 2006/0064698 A1* | 3/2006 | Miller et al. | 718/104 |
| 2006/0190605 A1* | 8/2006 | Franz et al. | 709/226 |

OTHER PUBLICATIONS

Multi-agent interaction for optimal resource allocation in computational grid Chun-Lin Li Zheng-Ding Lu La-Yuan Li Dept. of Comput. Sci., Wuhan Univ. of Technol., China; This paper appears in: Machine Learning and Cybernetics, 2004. Proceedings of 2004 International Conference on Publication Date: Aug. 26-29, 2004 vol. 1, On pp. 31-36.*

Barmouta, A., Buya, R., "GridBank: A Grid Accounting Services Architecture (GASA) for Distributed Systems Sharing and Integration"; Proceedings of the International Parallel and Distributed Processing Symposium (IPDPS'03) extracted from IEEE database on Feb. 9, 2009.*

Kevin Lai, Bernardo Huberman, Leslie Fine; Tycoon: A Distributed Market-Based Resource Allocation System; May 27, 2004.

* cited by examiner

| Auctioneer | Weight | Yields CPU | Scheduling Error | Mean Latency |
|---|---|---|---|---|
| Proportional Share | 1/10 | Yes | 0.09 | 81 ms |
| Proportional Share | 7/10 | Yes | 0.01 | 4.4 ms |
| Proportional Share | 7/10 | No | 1.16 | 4.7 ms |
| Auction Share | 1/10 | Yes | 0.01 | 3.6 ms |
| Auction Share | 1/10 | No | 0.02 | 96 ms |

FIG. 3

SYSTEM AND METHOD FOR ALLOCATING RESOURCES IN A DISTRIBUTED COMPUTATIONAL SYSTEM USING PROPORTIONAL SHARE AUCTIONS

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Many computer applications (e.g., rendering, data mining, and scientific computing) can be very complex and computationally intensive processes. Accordingly, it is desirable to find improved ways to focus and utilize computational resources for such operations. Peer-to-peer systems may be useful for such utilization. Peer-to-peer systems may include a network setup that allows every computer to both offer and access network resources, such as shared files, without requiring a centralized file server. For example, peer-to-peer clusters may be used to provide efficiency gains for complex and intensive computing processes by pooling together computational resources that can be shared among peers. Peer-to-peer clusters may allow users to share files, CPU cycles, memory, computing capabilities, networks, bandwidth, and storage.

Sharing of nodes dispersed in a network structure may facilitate a reduction of time required for packets or frames to travel from a sending station to a receiving station because applications can store data close to potential users. In other words, sharing of nodes may allow for lower delay. Accordingly, pooling of resources may allow increased throughput (i.e., the amount of data that can be sent from one location to another in a specific amount of time) for a network structure. Sharing may also allow greater reliability because of redundancy in hosts and network connections. Further, sharing may allow for operation at a lower cost than that of operating a comparable private system.

Although resource sharing can substantially improve computational resource utilization, there may still be excessive demand for resources because demand grows to fill available capacity. For example, resource demands of data mining, scientific computing, rendering, and Internet services have kept pace with electronic hardware improvements (e.g., increased storage capacity). Accordingly, allocation problems can be an obstacle to resource sharing. Some allocation problems may include strategic users who act in their own interest, rapidly changing and unpredictable demand, and hundreds of thousands of unreliable hosts that are physically and administratively distributed.

Existing allocation systems may not provide users with incentives to honestly report task values because the users can receive favorable allocations by providing disproportionate requests. Additionally, existing systems may not assist with allocation because they perform poorly with changing loads, impose bottlenecks, and decrease reliability. Further, some allocation systems do not properly scale to a large number of distributed hosts. What is needed is an improved allocation solution that maximizes economic efficiency and that can scale to many different distributed hosts. Additionally, what is needed is an allocation solution that provides users with the ability to express preferences for different resources concisely and in a manner that is efficient to process.

BRIEF DESCRIPTION OF THE DRAWINGS

FIG. 3 is a table illustrating the scheduling error and latency for different scheduling mechanisms with different application behaviors.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
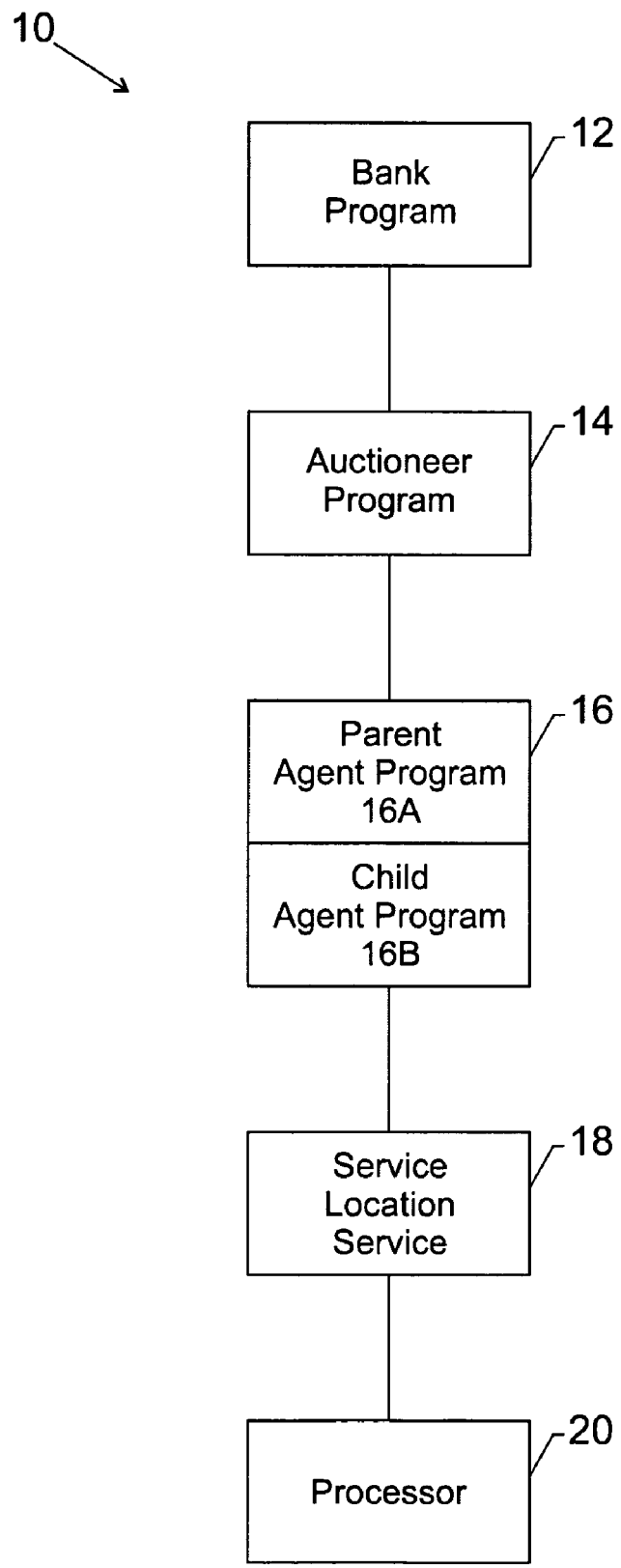
FIG. 1 is a block diagram illustrating a system for distributed market-based resource allocation in accordance with embodiments of the present invention.

FIG. 1 is a block diagram illustrating a system for distributed market-based resource allocation in accordance with embodiments of the present invention. The illustrated system may be generally referred to by reference numeral 10. Broadly, system 10 may comprise three main components or programs: a bank program 12, an auctioneer program 14, and user agents 16. Additionally, embodiments of the present invention may comprise a service location service 18 (e.g., Domain Name System and Lightweight Directory Access Protocol). A processor 20 may be employed to execute the bank program 12, the auctioneer program 14, the user agents 16 and the service location service 18. While FIG. 1 separately delineates specific components, in other embodiments, individual components may be split into multiple components or combined into a single component. Additionally, in some embodiments of the present invention, the components in the illustrated system 10 do not operate in the illustrated order. Further, individual components may represent hardware, software, or some combination thereof.

A proportional share scheduler may assist in allocation of a finite inventory of resources to a plurality of users. However, this approach may not necessarily provide users with an incentive to honestly report the value of their tasks. This lack of incentive may result in unimportant tasks getting as many resources allocated to them as critical jobs. This may cause economic efficiency to decrease as load increases, eventually going to zero. To mitigate this, users may engage in "horse trading" where one user agrees not to run an unimportant job when another user is running a critical one in exchange for returning the favor in the future. While "horse trading" may mitigate some problems, it may impose excess latency and work on users.

Combinatorial optimization algorithms are another approach to computing a schedule for the use of scarce resources. That approach assumes that the load on resources is deterministic and uses a centralized algorithm to calculate the optimal algorithm. An optimal algorithm may comprise an algorithm that gives the best possible allocation of resources to entities based on their valuation of the resources. A centralized algorithm may comprise an algorithm that runs on one physical host or at one physical location. Centralized algorithms may be NP-hard, which means that they cannot be solved in polynomial time. As a result combinatorial optimization algorithms may perform poorly with rapidly changing and unpredictable loads. Another deficiency of centralized optimizers is that they may impose bottlenecks and decrease the reliability of an otherwise decentralized system. For example, if a centralized system were running at a certain location and power was lost at that particular location, resources of the system will become inaccessible even though the resources are distributed at different locations that still have power. Additionally, it should be noted that optimal algorithms typically share the proportional share problem of not eliciting the true value of tasks from respective users resulting in economic efficiency decreasing as load increases.

These allocation approaches may not maximize economic efficiency. Indeed, they may be vulnerable to inaccurate priorities and may degrade as users claim that their jobs are critically important even when they are not. Additionally, problems may occur with scaling to a large number of distributed hosts. For example, centralized controllers may be unable to monitor and control a large number of hosts. Further, distributed hosts may impose a delay before monitoring updates (e.g., a status indicator showing how much of a resource is available) can reach a centralized controller, causing it to schedule using stale information. Additionally, users may be allowed to express preferences for different resources concisely and in a manner that is efficient to process, thus creating inefficiency.

Embodiments of the present invention relate to distributed market-based resource allocation architecture and an auction share local resource scheduler. Distributed market-based resource allocation architecture may include a non-centralized market (i.e., a market that does not rely on any one physical location or host to perform allocation) wherein users have a limited amount of currency which can be used to bid for resources. An auction share resource scheduler may include an operating system scheduler (i.e., code) that determines which applications on each machine should get certain resources. These determinations may be made locally on each machine and may allow applications to trade off throughput and latency.

Through simulation, it has been shown that a market-based system in accordance with embodiments of the present invention has greater utility than a non-market-based proportional share system. Additionally, it has been shown through simulation that auction share in accordance with embodiments of the present invention is a high utilization, low latency, and fair solution. Embodiments of the present invention provide incentive compatible mechanisms to encourage users to truthfully specify the importance of their jobs. This increases economic efficiency. Further, embodiments of the present invention are distributed, yet concise and efficient.

Embodiments of the present invention may utilize two design principles for architecture construction. First, embodiments of the present invention may utilize the design principle of separation of mechanism and strategy. Separation of mechanism and strategy is an important design principle because mechanism and strategy have different requirements and consequences for complexity, security, and efficiency. Second, embodiments of the present invention may utilize the design principle of distribution of allocation. This design principle is important because it may facilitate allocation of resources for very large systems in accordance with embodiments of the present invention.

A strategy in accordance with embodiments of the present invention may comprise an algorithm that establishes how an entity achieves certain preferences, where preferences include what an entity requests for resources and how much it allows for payment. Such a strategy takes high level preferences of a user and application regarding how an application should be run and interprets the high level preferences into valuations of resources. For example, a web server may be more limited by latency than throughput and thus may be adapted to consume a few resources on many hosts based on a chance that one of its hosts will be close to a new client. Similarly, a database server or a rendering application may be best served making a different tradeoff. Such preferences may not even be technical. For example, an application distributing sensitive information may be adapted to avoid hosts in certain countries. As a result of the diversity of preferences, strategies that are specialized to particular users and applications may be more efficient than those that are not. However, if a resource allocation system were to incorporate strategies as part of its mechanism, it would either have to limit the preferences of the applications or increase the complexity of its mechanisms.

A mechanism in accordance with embodiments of the present invention may comprise an algorithm that determines which entities should get certain resources based on a set of preferences. Specifically, mechanisms in accordance with embodiments of the present invention may be based on the assumption that users are self-interested. Such a mechanism may provide incentives for users to truthfully reveal their values for resources and for providers to provide desirable resources. Mechanisms in accordance with embodiments of the present invention may need to provide primitives for expressing preferences. Primitives may comprise very simple requests, such as "application A requests resource B." Embodiments of the present invention may allow applications to specify on which hosts they wish to run. Further, an auction share scheduler in accordance with embodiments of the present invention may allow applications to specify how to balance tradeoffs between throughput, latency, and risk. A mechanism may be critical to the security and efficiency of the system. Accordingly, it may be desirable in accordance with embodiments of the present invention to provide a mechanism that is simple to understand and implement. By separating strategy and mechanism, embodiments of the present invention enable mechanisms to be simple without limiting preferences expressed by users and applications. Instead, embodiments of the present invention may provide incentives (e.g., more resources will be provided to an entity if the entity conserves presently) for users and application writers to specialize and optimize strategies.

Second, embodiments of the present invention may utilize the design principle of distribution of allocation. Embodiments of the present invention are adapted to allocate resources for very large systems (e.g., Grid or PlanetLab) and thus may distribute the allocation of resources as much as possible. This may increase reliability because the failure of one host will not prevent allocating resources on another host. Additionally, distribution may mitigate accidental or malicious misbehavior by one host (e.g., charging credits without providing resources). Users or parent agents, as discussed in detail below, may eventually notice that some hosts have poor price/performance and select other hosts on which to run.

Finally, distributed allocation may reduce the latency to change allocations because all allocation decisions may be made local to a host.

Using the principles described above, embodiments of the present invention may be divided into the components illustrated in FIG. 1. It should be noted that the user agents 16 may be further divided into a parent agent 16A and child agent 16B in accordance with embodiments of the present invention. The parent agent 16A and child agent 16B may implement strategy, while the auctioneer program 14 implements mechanisms. The service location service 18 and the bank program 12 may be considered infrastructure in accordance with embodiments of the present invention.

User agents 16 in accordance with embodiments of the present invention may comprise programs that represent users desiring resources. Specifically user agents 16 in accordance with embodiments of the present invention include programs that implements a strategy. These user agents 16 may bid in various markets that are associated with different auctioneer programs 14 to get required resources. Further, these agents 16 may be customized for different applications and users in accordance with embodiments of the present invention. For example, resource requirements for rendering applications may be different from resource requirements for web servers and payroll applications. An agent 16 in accordance with embodiments of the present invention may be adapted to bid appropriately based on requirements for its associated application.

A parent agent 16A in accordance with embodiments of the present invention may perform all high-level distributed resource management on behalf of a user and may be specialized for specific applications (e.g., batch applications). The two main tasks for a parent agent 16A may be budgeting and managing child agents 16B. Budgeting may be considered important in accordance with embodiments of the present invention because it removes the burden of managing budgets from a user. For example, in accordance with embodiments of the present invention, a parent agent may be specialized for a batch application, wherein a user may specify a number of credits, a deadline, and a number of hosts to run on. If the user specifies to spend $700 for 100 minutes on seven hosts, the batch parent agent may budget $1 for each host per minute.

Managing child agents 16B may be an important task for parent agents 16A in accordance with embodiments of the present invention because some hosts may be more cost-effective that other hosts. This may be because heterogeneity in the host platform or because one host is more lightly loaded than another. In one example in accordance with embodiments of the present invention, a parent agent specialized for a batch application may monitor progress and costs associated with candidate hosts by querying the child agents 16B. If a child agent 16B has a low performance to cost ratio, it may terminate the child agent 16B and the associated application process running on that host. The parent agent 16A may replace the child agent 166B that has been terminated with a randomly selected host based on a chance that the replacement will run better.

Child agents 16B in accordance with embodiments of the present invention may bid for host resources and monitor application progress. Specifically, child agents 166B in accordance with embodiments of the present invention may monitor application progress by maintaining application specific statistics (e.g., latency and throughput of transactions on a web server and rate of frames rendered for a rendering application). It should be noted that although a child agent 16B is described as "bidding," a child agent 16B may actually transfer a lump sum to the auctioneer program 14, which may then perform fine-grained bidding. Fine-grained bidding may include bidding using primitives. This arrangement may be more efficient than communication between the child agent 166B and the auctioneer program 14. Additionally, such an arrangement may remove any need to communicate frequently with the bank program 12.

Auctioneer programs 14 in accordance with embodiments of the present invention include programs that implement mechanisms. Specifically, auctioneer programs 14 in accordance with embodiments of the present invention may be adapted to run on each host that contributes resources to the system 10. Further, auctioneers 14 in accordance with embodiments of the present invention may manage resources such that each user of a plurality of users receives the particular resources each user has purchased. An auctioneer program 14 may have a market for each of the resources available on its host. Auctioneer programs 14 may schedule local resources in a way that approximates proportional share, but allows flexibility for latency-sensitive and risk-averse applications. Additionally, auctioneer programs 14 in accordance with embodiments of the present invention may perform efficient first and second price sealed bid auctions for fine-grained resources (e.g., 10 ms CPU time slices). This may allow for high utilization and the agility to adapt very quickly to changes in demand and/or supply.

The bank program 12 in accordance with embodiments of the present invention may be a program adapted to manage records relating to currency owned by each user in the system 10 and may allow currency to be transferred from one user to another in accordance with embodiments of the present invention. For example, the bank program 12 may maintain account balances for all users and providers. Two issues with the bank program 12 are security and funding policy. For example, counterfeiting of currency may be a security issue. Embodiments of the present invention deal with counterfeiting by only allowing transfers between accounts. For example, users may pay providers by directly transferring funds from one account to another. This prevents counterfeiting in accordance with embodiments of the present invention and involves the bank in all transactions, which may affect scalability. It should be noted that transfers typically only occur in the following three situations: when a child agent initially funds its application, when a child agent refreshes those funds when they are exhausted, and when the budget of the parent agent changes.

Funding policy in accordance with embodiments of the present invention may determine how users obtain funds. For example, a funding policy may establish a dynamic relating to participant acquisition of funds. Embodiments of the present invention may comprise two types of funding policies, including open loop and closed loop policies. In an open loop funding policy, users may receive an allotment of funds when they join the system and at set intervals afterwards. System administrators may set an income rate based on exogenously determined priorities (e.g., the web server is twice as important as allowing email access). Providers may accumulate funds and return them to the system administrators. In a closed loop (i.e., peer-to-peer) funding policy, users themselves may bring resources to the system when they join the system. Users may receive an initial allotment of funds but no funding grants after joining. Instead, users may be required to earn funds by enticing other users to pay for their resources. A closed loop funding policy in accordance with embodiments of the present invention may be preferable because it encourages service providers to provide desirable resources and therefore should result in higher economic efficiency.

Service location services (SLS) 18 may be used in accordance with embodiments of the present invention by parent agents 16A to locate particular kinds of resources. Auctioneer programs 14 may use the SLS 18 to advertise resources. Some embodiments of the present invention may use a simple centralized soft-state server. However, embodiments of the present invention do not require strong consistency and any distributed SLS 18 in accordance with embodiments of the present invention may be used. Parent agents 16A may monitor and optimize the end-to-end performance of assigned applications. Accordingly, stale information in the SLS 18 will merely delay convergence on an efficient set of resources by the parent agent 16A.

Figure 2:
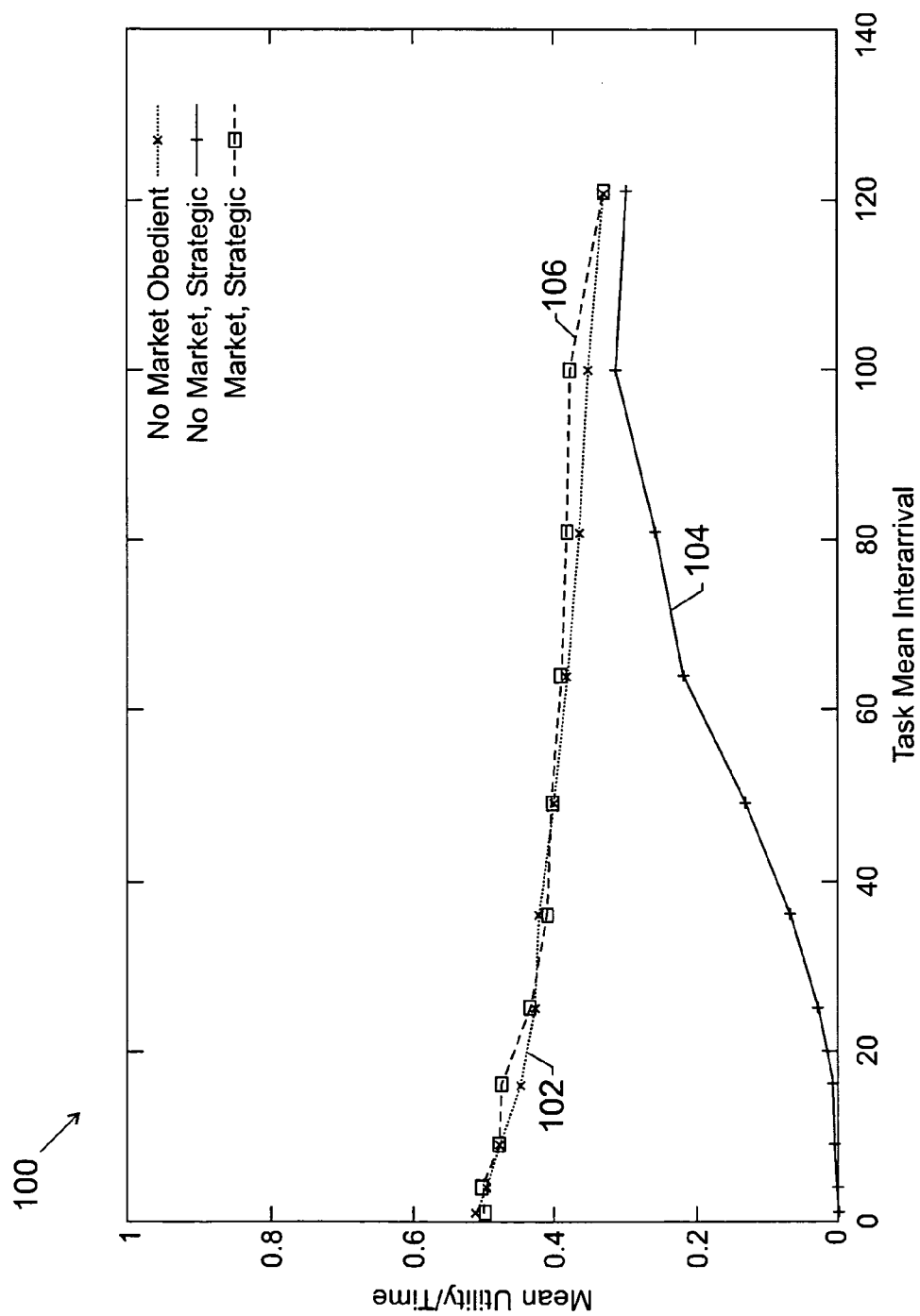
FIG. 2 is a graph illustrating the utility of different user behaviors and mechanisms as a function of system load in accordance with embodiments of the present invention.

FIG. 2 is a graph illustrating the utility of different user behaviors and mechanisms as a function of system load in accordance with embodiments of the present invention. These results, which may be referred to by reference numeral 100, show that a market for computational resources effectively maintains a high utility despite strategic users. A market based proportional share may be used as an initial approach for simulations in accordance with embodiments of the present invention. This initial approach may be beneficial because embodiments of the present invention simulate events on many hosts on large timescales. However, it should be noted that a separate simulator in accordance with embodiments of the present invention may be used for an auction share scheduler. Auction share simulators in accordance with embodiments of the present invention may be adapted to simulate events on one host on small time scales. Is some embodiments of the present invention, the two simulators mentioned above may be merged.

The simulation results illustrated by FIG. 2 are of 100 users submitting tasks with a Poisson inter-arrival time, based on the Poisson formula for calculating trunks. The simulation results were achieved by running a market based proportional share simulation for 1000 seconds with 10 hosts available for running tasks. It was assumed in the simulation that no overhead exists for distributing and starting tasks. The size and deadline of the tasks are also from a Poisson distribution. Each task has a value selected uniformly at random from half-open interval (0, 1]. If a task completes by the deadline, then the users may receive value*size utility in accordance with embodiments of the present invention. Otherwise, the users may receive nothing. Three different user behaviors are simulated in accordance with embodiments of the present invention, including obedient 102, strategic without a market 104, and strategic with a market 106. Obedient users may be characterized by assignment of a proportional share weight to their tasks equal to the value of such tasks. Non-market strategic users may assign the maximum possible weight to all of their tasks. Market strategic users may have a limited budget for assigning weights. Specifically, these users may have an income of $1 per time unit and they can save this income or spend it by assigning some of it as the weight of one of their tasks.

Market strategic users 106 may be simulated as using a budgeting strategy in accordance with embodiments of the present invention. For example, strategic users may assign weights at each host at each time unit to be:

$$\frac{balance * value}{num\_hosts * (deadline - now)}$$

where balance is the current credit balance of the user, value is the value of the highest valued task of the user, num_hosts is the number of hosts to run on, deadline is the deadline of the currently most valuable task, and now is the current time.

The y-axis in FIG. 1 represents the mean utility per host per time unit. This does not exceed 1.0 and the only way for that to be a maximum is if there is always a task in the system with the value 1.0, which is not true in most cases. The y-axis shows the mean inter-arrival of tasks in the system and is a measure of overall system load. Each point in the graph is a run of the simulator. As the load increases to the left, the obedient users 102 without a market are able to maintain a high level of utility. In contrast, the non-market strategic users 104 are able to maintain a high level of utility when the system is moderately loaded (e.g., from 120 to 100), but when the load saturates the system, utility drops to zero. This may be because the system wastes resources running tasks that never meet their deadlines and therefore provide no utility. As the number of tasks increase, this becomes more likely. In a system without a mechanism or significant social pressure (e.g., an office environment where people are dissuaded from such activities), this is essentially inevitable. With the market mechanism in accordance with embodiments of the present invention, strategic users may be forced to truthfully reveal the value of their tasks and thus the system can maintain a high utility.

The auction share scheduler in accordance with embodiments of the present invention may achieve the high utilization of a proportional share scheduler, the low latency of a borrowed virtual time scheduler, the low risk of reservations, and the negation of strategy of a market scheduler. Additionally, an auction share scheduler may be fair and computationally efficient in accordance with embodiments of the present invention. One exemplary use of an auction scheduling algorithm may be CPU scheduling. However, auction scheduling can be used as a straightforward extension to other resources like network bandwidth and disk storage. For CPU scheduling in accordance with embodiments of the present invention, the resources may be 10 ms timeslices of the processor. An algorithm for CPU scheduling may consist of child agents that bid for resources for an application process and an auctioneer that resolves the bids, allocates resources, and collects credits. In a typical operating system, part of the auctioneer may reside in the processor scheduler of the kernel (i.e., core of the operating system).

Each child agent i (e.g., 16B) in accordance with embodiments of the present invention may have a balance of $b_i$ credits, an expected funding interval of $E(t_i)$, and an expected number of processor-seconds needed during $E(t_i)$ of $q_i$. A parent agent (e.g., 16A) may fund its child agents periodically in proportion to their assigned importance. $E(t_i)$ is the average amount of time between such funding. $E(t_i)$ may be assumed to be on the order of seconds and therefore large relative to the timeslice size. The child agent of a batch application in accordance with embodiments of the present invention may set $q_i$ to be $E(t_i)$ in processor-seconds because the batch application may be adapted to run as much as possible. The child agent of a delay-sensitive application may set $q_i$ to be less than $E(t_i)$ because the application is willing to sacrifice some processor-seconds for lower delay. For example, a web server may be adapted to prefer sleep (i.e., suspend execution for an interval) sometimes in return for having priority when a request is received. The more readily an application trades throughput for delay, the smaller $q_i$ is relative to its $E(t_i)$ in accordance with embodiments of the present invention.

To allocate a timeslice in accordance with embodiments of the present invention, an auctioneer 18 may compute bids of each thread i as $b_i/q_i$. The auctioneer may then allocate the timeslice to the thread with the highest bid in accordance with embodiments of the present invention. After elapsed elapsed seconds, the running thread may be context-switched either because its allocation finished or because another thread with a higher bid becomes able to run. At this point, in accordance with embodiments of the present invention, the thread may pay its bid to the auctioneer in proportion to the amount of elapsed time:

$$\frac{\text{Elapsed}}{\text{timeslice}} * \frac{b_i}{q_i}$$

The auctioneer may then deduct this amount from winning from the balance of the winning process. Alternatively, the auctioneer may charge the winning process the second bid from the second highest bidder.

This algorithm may negate the effect of strategies because it corresponds to a series of first or second price sealed bid auctions. A difference between an auction share auctioneer and a regular auctioneer may be that the auction share auctioneer automatically computes bids for clients instead of having the clients perform the calculation. If clients choose to manage the bidding, they can do so by changing $q_i$ in accordance with embodiments of the present invention. However, in accordance with embodiments of the present invention, only clients that wish to change their latency-throughput tradeoff may gain anything from doing so.

Auction share may be considered computationally efficient because the only work the auctioneer needs to do each timeslice is update the balance of the previous winning process and select the highest current bid. In some embodiments of the present invention, the second highest current bid may be selected as well. The scheduler implementations operating systems in accordance with embodiments of the present invention may be capable of performing similar calculations at low overhead. A typical implementation may keep process priorities in a heap, which allows the selection of the highest value in O(1) time, and updating of one of the values in O(log n) time, where n is the number of values. Changing $q_i$ and funding (which changes $b_i$) may also require O(log n) time. However, these changes happen infrequently.

This basic algorithm has high utilization, low latency, fairness, low overhead and negates strategies. However, it still has significant risk. The arrival of new child agents may reduce the resources allocated to all other child agents using the processor. Some risk-verse users may prefer having a higher lower bound on the resources they receive in an interval instead of having more total resources in that interval. An example may be a real-time process like a game server that would benefit more from processing all its requests by their deadlines rather than finishing some very quickly and some very slowly.

To satisfy theses processes, auction share offers a form of reservation using recent history as a guide to calculate a price for the reservation. A process may request a percentage of the process r for a time period of p timeslices. In some cases, the auctioneer must reject the reservation immediately because it has already sold its limit of reservations. If this is not the case, the auctioneer may calculate the price for this reservation as:

$(\mu+\sigma)*r*p$ where $\mu$ is the average price per timeslice, and $\sigma$ is the standard deviation of the price. The process may either reject this price or pay it. If the process pays the price, p begins immediately. During the reservation, the auctioneer enters a proxy bid in its own auction such that the reserving process always receives r of the processor. This assumes the price in the recent past is indicative of the price in the near future and that price is normally distributive.

Simulation results in accordance with embodiments of the present invention demonstrate that auction share achieves high utilization, low latency, and high fairness while providing an incentive for truth-telling to rational users. A proportional share scheduler can achieve high utilization and either low latency or fairness, but not both. Further, a proportional share scheduler does not provide incentives for truth-telling. A latency sensitive application may be simulated in accordance with embodiments of the present invention like a web server running with three batch applications on a single processor. The desired long term processor share for the web-serving application may be 1/10. During each timeslice, the web server may have a 10% probability to receive a request, which takes 10 ms of CPU cycles to service. Otherwise, the web server may sleep. Batch applications may constantly be ready to run. Regarding the proportional share scheduler, the weight of the web server and batch applications may be initially set to be 1, 2, 3, and 4, respectively, in accordance with embodiments of the present invention. Regarding the auction scheduler, the processes may not be funded at precise intervals. Instead, income rates may specify the mean inter-arrival times of funding. In some embodiments of the present invention, 1000 timeslices of 10 ms are run.

FIG. 3 is a table illustrating the scheduling error and latency for different scheduling mechanisms with different application behaviors. The table in FIG. 3 may be generally referred to by reference numeral 200. Specifically, table 200 shows the latency and fairness for different mechanisms and different application behaviors. "Weight" represents the weight (for proportional share) or income rate (for auction scheduling) given the web server. "Yields CPU" represents whether the web server correctly yields the CPU after servicing a request. "Scheduling Error" measures by how much the actual CPU time used by applications deviates from the amount intended. This is computed as the sum of the relative errors for each of the applications. For example, 0.09 may indicate that the sum of the relative errors is 9%. Fairness is inversely proportional to the scheduling error. "Mean latency" represents the mean latency for the latency-sensitive application to service requests.

The second row of table 200 shows that proportional share scheduling provides low error, but high latency. It should be noted that this latency is proportional to the total number of processes capable of running in the system, which is only four in presently illustrated simulations. The latency may be reduced by increasing the weight of the web server, as shown in the third row of table 200. This assumes that the web server yields to the processor after finishing a request. However, a rational user may exploit the extra weight granted to an associated application in order to perform other computations to benefit the user. Unfortunately, as shown in the fourth row of table 200, this may be an expense of the overall fairness of the system.

With auction share scheduling, the weight of the web server does not need to be boosted to achieve low latency, as is demonstrated by the fifth row of table 200. More importantly, if the web server fails to accurately estimate the resources it requires (either accidentally or deliberately), it only penalizes its own latency. This is demonstrated in the last row of table 200. The overall fairness of the system remains high. This provides the incentive for child agents to truthfully reveal their requirements for resources and therefore allows the system to achieve high economic efficiency. In addition, auction share has the same utilization as proportional share because the processor is always utilized.

Figure 4:
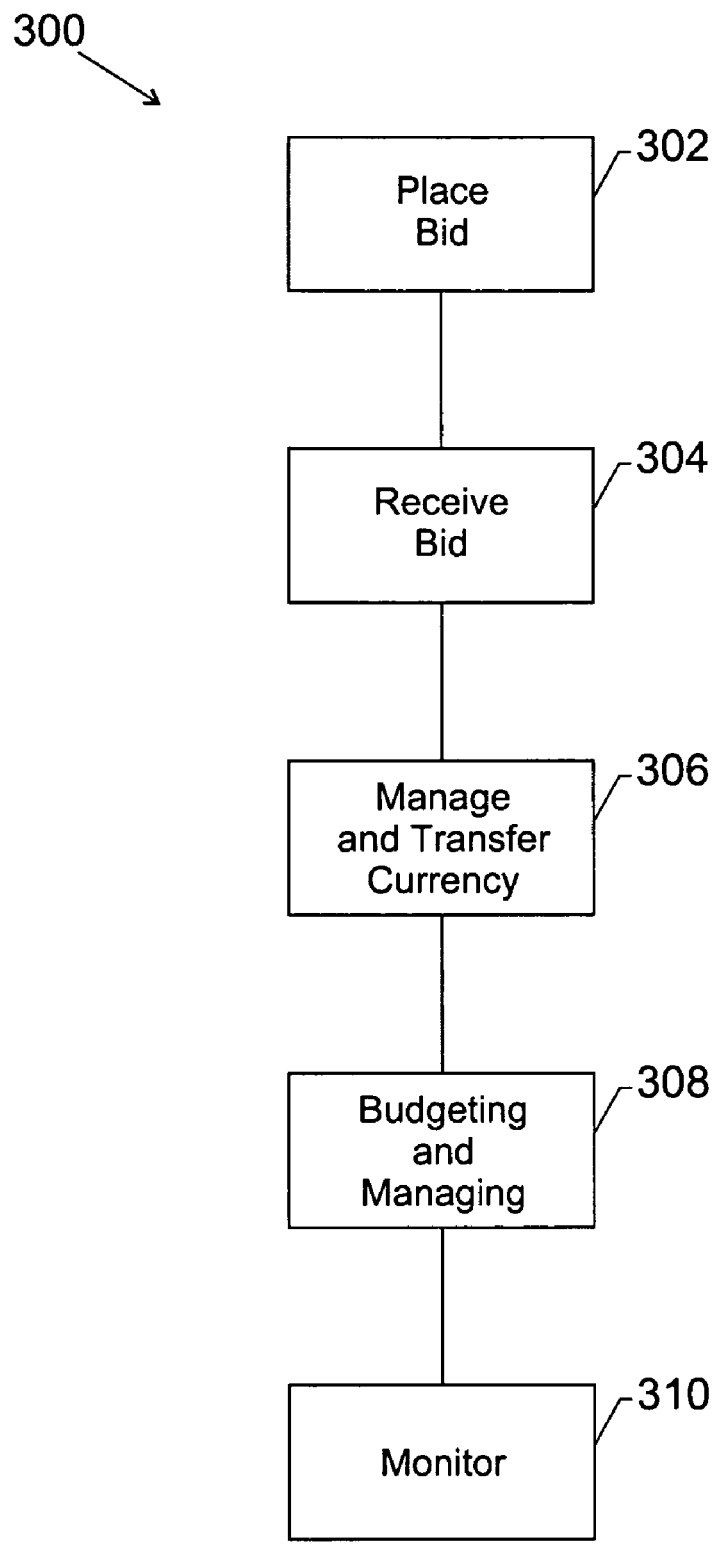
FIG. 4 is a block diagram illustrating a processor-based method in accordance with embodiments of the present invention.

FIG. 4 is a block diagram illustrating a processor-based method in accordance with embodiments of the present invention. The processor-based method may be generally referred to by reference numeral 300. Specifically, method 300 may comprise placing a bid (block 302) with a user agent program on behalf of a user for computational resources based on a preference for a desired set of the computational resources. Block 304 may represent receiving the bid from each of the plurality of user agent programs and determining entitlement to the computational resources based on an evaluation of the bids with an auctioneer program. Block 306 may represent managing records relating to currency corresponding to each of the user agent programs and facilitating transfer of currency based on an outcome of the evaluation of the bids with a bank program. Block 308 may represent budgeting and managing a plurality of child agent programs with a plurality of parent agent programs and placing the bid based on budgets provided by the plurality of parent agent programs. Block 310 may represent monitoring progress of applications requiring resources with the plurality of child agent programs.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for allocating resources in a distributed computational system comprising:
   a computer readable medium having:
   a plurality of user agent programs, each adapted to place a bid on behalf of a user for computational resources based on a preference for a desired set of the computational resources;
   an auctioneer program adapted to receive the bid from each of the plurality of user agent programs and to determine entitlement to the computational resources based on an evaluation of the bids;
   a bank program adapted to manage records relating to a currency corresponding to each of the user agent programs and to facilitate transfer of the currency based on an outcome of the evaluation of the bids; and
   wherein the plurality of user agent programs include a plurality of parent agent programs and child agent programs, the plurality of parent agent programs being adapted to budget and manage the plurality of child agent programs, the plurality of child agent programs being adapted to place the bid based on budgets provided by the plurality of parent agent programs and monitor progress of applications requiring resources.

2. The system of claim 1, wherein the plurality of parent agent programs are adapted to terminate a particular child agent program and associated application process based on a query of the particular child agent program.

3. The system of claim 1, comprising a service location program adapted for use by user agent programs to locate particular types of resources.

4. The system of claim 1, comprising a customized user agent adapted for a set of preferences and an application.

5. The system of claim 1, wherein the auctioneer program is adapted to run on each of a plurality of hosts in the system.

6. The system of claim 1, wherein the auctioneer program is adapted to implement a mechanism that enables trade of throughput and latency.

7. The system of claim 1, wherein the auctioneer program is adapted to perform first and second price sealed bid auctions for fine-grained resources.

8. A processor-based method for allocating resources in a distributed computational system comprising:
   using a processor placing a bid with a user agent program on behalf of a user for computational resources based on a preference for a desired set of the computational resources;
   using a processor receiving the bid from each of the plurality of user agent programs and determining entitlement to the computational resources based on an evaluation of the bids with an auctioneer program;
   using a processor managing records relating to currency corresponding to each of the user agent programs and facilitating transfer of currency based on an outcome of the evaluation of the bids with a bank program; and
   using a processor budgeting and managing a plurality of child agent programs with a plurality of parent agent programs and placing the bid based on budgets provided by the plurality of parent agent programs and monitoring progress of applications requiring resources with the plurality of child agent programs.

9. The processor-based method of claim 8, comprising terminating a particular child agent and associated application process based on a query of the particular child agent.

10. The processor-based method of claim 8, comprising locating particular types of resources with a service location program.

11. The processor-based method of claim 8, comprising customizing a user agent for a set of preferences and an application.

12. The processor-based method of claim 8, comprising running the auctioneer program on each of a plurality of hosts in the system.

13. The processor-based method of claim 8, comprising implementing a mechanism that enables trade of throughput and latency.

14. The processor-based method of claim 8, comprising performing first and second price sealed bid auctions for fine-grained resources.

15. A computer program product for allocating resources in a distributed computational system comprising:
   a tangible medium;
   a plurality of user agent programs stored on the tangible medium, each of the plurality of user agent programs adapted to place a bid on behalf of a user for computational resources based on a preference for a desired set of the computational resources;
   an auctioneer program stored on the tangible medium, the auctioneer program adapted to receive the bid from each of the plurality of user agent programs and to determine entitlement to the computational resources based on an evaluation of the bids;
   a bank program stored on the tangible medium, the bank program adapted to manage records relating to currency corresponding to each of the user agent programs and to facilitate transfer of currency based on an outcome of the evaluation of the bids; and
   wherein the plurality of user agent programs include a plurality of parent agent programs and child agent programs stored on the tangible medium, the plurality of parent agent programs being adapted to budget and manage the plurality of child agent programs, the plurality of child agent programs being adapted to place the bid based on budgets provided by the plurality of parent agent programs and monitor progress of applications requiring resources.

16. The computer program product of claim 15, comprising a service location program stored on the tangible medium, the service location service adapted for use by user agent programs to locate particular types of resources.

17. The computer program product of claim 15, comprising a customized user agent module stored on the tangible medium, the customized user agent module adapted for customization for a set of preferences and an application.

18. A system for allocating resources in a distributed computational system comprising:

means for placing a bid on behalf of a user for computational resources based on a preference for a desired set of the computational resources;

means for receiving the bid from each of the plurality of user agent programs and determining entitlement to the computational resources based on an evaluation of the bids;

means for managing records relating to currency corresponding to each of the user agent programs and facilitating transfer of currency based on an outcome of the evaluation of the bids; and means for budgeting and managing a plurality of child agent programs with a plurality of parent agent programs and placing the bid based on budgets provided by the plurality of parent agent programs and monitoring progress of applications requiring resources with the plurality of child agent programs.

* * * * *